United States Patent [19]

Goldenberg

[11] 4,313,428
[45] Feb. 2, 1982

[54] DIVERTER/BYPASS VALVE

[76] Inventor: Enrique A. Goldenberg, 140 Mount Lassen Dr., San Rafael, Calif. 94903

[21] Appl. No.: 118,352

[22] Filed: Feb. 4, 1980

[51] Int. Cl.$^3$ .............................................. F16K 1/22
[52] U.S. Cl. ............................... 126/422; 137/625.29; 251/285; 251/286; 126/416
[58] Field of Search .................... 137/625.29; 251/286, 251/285; 126/419, 422, 415, 416, 427

[56] References Cited

U.S. PATENT DOCUMENTS

| | | | |
|---|---|---|---|
| 1,531,729 | 3/1925 | Bovey | 137/625.29 |
| 2,029,232 | 1/1936 | Green | 137/625.29 |
| 2,113,775 | 4/1938 | Van Vulpen | 137/625.29 X |
| 2,540,229 | 2/1951 | Alessandro | 137/625.29 |
| 3,238,969 | 3/1966 | Champion | 137/625.29 X |
| 4,061,132 | 12/1977 | Ashton | 137/625.29 X |

Primary Examiner—Arnold Rosenthal
Attorney, Agent, or Firm—Townsend and Townsend

[57] ABSTRACT

The present invention provides a unitary diverter/bypass valve. The valve has a housing which includes a chamber which is rotationally symmetric about one axis. A damper is mounted within the housing so that the damper is rotatable about the axis of the chamber. A pair of actuatable stops stop the damper from rotating in a preferred direction in either of two positions, one such position being a diversion position, and the other a bypass position. A primary inlet is located in the housing so that the axis of the inlet is offset from the axis of the chamber. As a result, fluid entering the chamber through the primary inlet tends to rotate the damper in the preferred direction. The position of the damper controls the flow of fluid to a diversion outlet, in which the fluid reenters the valve and exits through a primary outlet, or directly to the primary outlet, bypassing the diversion flow path.

14 Claims, 4 Drawing Figures

DIVERTER/BYPASS VALVE

BACKGROUND OF THE INVENTION

The present invention provides a unitary diverter/bypass valve which controls the flow of a fluid through a secondary flow path.

A typical situation in which a valve system is required to perform diversion and bypass functions is found in solar heating of swimming pools. Water drawn from the pool and filtered is diverted to a solar collector when solar heating is available and useful before passing through a conventional heater and returned to the pool. If the water already is as hot as desired, or if solar energy is not available, the solar collector is simply bypassed.

In conventional systems employing solar heating of swimming pools, a relatively complex and expensive valve system is required to control diversion to the solar collector. A first control valve is used to divert the water to the collector and isolate the collector, if desired, and a second control valve is used to bypass the collector. At least two check valves are also required, one to prevent backflow to the filter unit, and one to prevent flow to the collector in the bypass mode. The primary deterent to the use of solar energy is usually cost, and the additional expense of such a complex valving system is a significant barrier to the widespread use of solar heating in swimming pools. Also, such extra plumbing significantly increases the pumping pressure required to move the water through the system.

SUMMARY OF THE INVENTION

The present invention provides a unitary diverter/bypass valve. The valve has a housing which includes a chamber which is rotationally symmetric about one axis. A damper is mounted within the housing so that the damper is rotatable about the axis of the chamber. A pair of actuatable stops stop the damper from rotating in a preferred direction in either of two positions, one such position being a diversion position, and the other a bypass position.

A primary inlet is located in the housing so that the axis of the inlet is offset from the axis of the chamber. As a result, fluid entering the chamber through the primary inlet tends to rotate the damper in the preferred direction. A diversion outlet is located in the housing so as to be in fluid communication with the primary inlet when the damper is in its diversion position. A diversion inlet is located in the housing so that the damper prevents fluid communication from the primary inlet to the diversion outlet through the chamber in both its diversion and bypass positions. The damper prevents fluid communication from the diversion outlet to the diversion inlet through the chamber in its diversion position. A primary outlet is located in the housing so that the primary outlet is in fluid communication with the diversion inlet when the damper is in its diversion position, and in fluid communication with the primary inlet when the damper is in its bypass position.

When the stops hold the damper in its diversion position, fluid enters the valve through the primary inlet and exits the valve through the diversion outlet. The diversion outlet leads to a secondary flow path such as a solar collector. At the same time fluid enters the valve through the diversion inlet and exits through the primary outlet. When the damper is in its bypass position, a fluid enters the valve through the primary inlet and leaves the valve directly through the primary outlet, bypassing the diversion inlet and outlet entirely.

In a typical solar heated pool installation, the valve of the present invention functionally replaces the valve used to divert/isolate the collector system, the valve used for bypassing the collector and the check valve used to prevent flow of the collector in the bypass mode. The valve of the present invention does not introduce restricted or tortuous flow paths into the system and thus avoids the pressure losses inherent in such prior systems.

The valve of the present invention is operated by simply retracting one of the actuatable stops when a change in position of the valve is desired. All of the diversion/bypass functions needed are provided in a unitary construction, avoiding the complex plumbing required for similar installations in the prior art. The valve of the present invention is simple, reduces pressure losses, is easy to operate and relatively fail safe, providing a cost effective and efficient alternative to the complex plumbing systems now in use.

The present invention is described in connection with a solar heating system for a swimming pool. However, it is readily apparent that the valve of the present invention can be used in a variety of applications where combined diversion/bypass functions are required.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
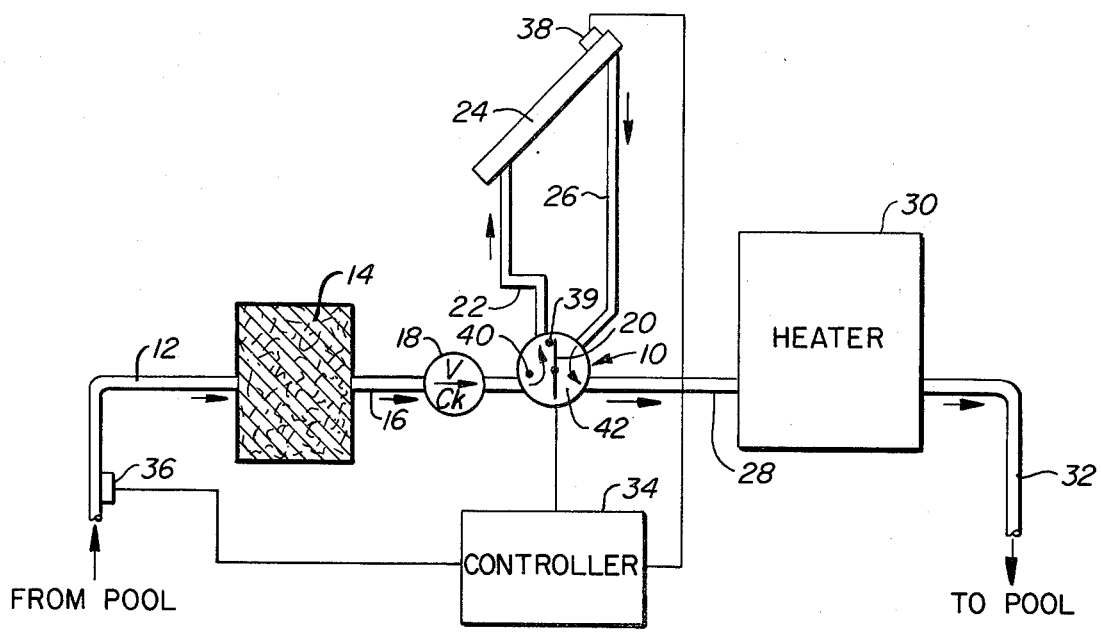
FIG. 1 is a schematic view illustrating the use of the preferred embodiment of the valve of the present invention in a solar heating system for a swimming pool.

A typical use of the preferred embodiment 10 of the valve of the present invention is illustrated by way of reference to FIG. 1. Water is drawn from a swimming pool through conduit 12, and passes through a conventional filter unit 14. The filtered water passes through a conduit 16 containing a check valve 18 to valve 10.

Valve 10 includes a damper 20 which is depicted in FIG. 1 in its diversion position. Accordingly, fluid entering valve 10 from conduit 16 is deflected by damper 20 and exits the valve through conduit 22. Conduit 22 leads to a solar collector 24, and the water drawn from the pool passes through the solar collector and is returned to valve 10 through conduit 26. Damper 20 in its diversion position allows the water entering the valve from conduit 26 to flow through the valve into a conduit 28 leading to conventional heater 30, from which the water is returned to the pool through conduit 32.

A controller 34 receives input from a sensor 36 which determines the temperature of the water drawn from the pool, and a second sensor 38 which determines whether solar energy is available. If sensor 36 indicates that the temperature of the water drawn from the pool is such that heating is desirable, and if sensor 38 determines that solar energy is available, controller 34 sets valve 10 in its diversion position as indicated. As illustrated in more detail hereinafter, the position of damper 20 is controlled by a pair of stops 39, 40 actuated by controller 34.

In FIG. 1, stop 39 is extended to maintain damper 20 in its diversion position as illustrated. If sensor 36 determines that the pool water need not be heated, or sensor 38 determines that solar energy is not available, stop 39 is retracted so that damper 20 rotates until it contacts extended stop 40. In this configuration, damper 20 is in its bypass position and water will pass directly through the valve from conduit 16 to conduit 28, bypassing solar collector 24 entirely. When solar heating is again desired, stop 40 is retracted and damper 20 rotates to its diversion position in contact with stop 39 and the cycle is repeated.

Figure 2A:
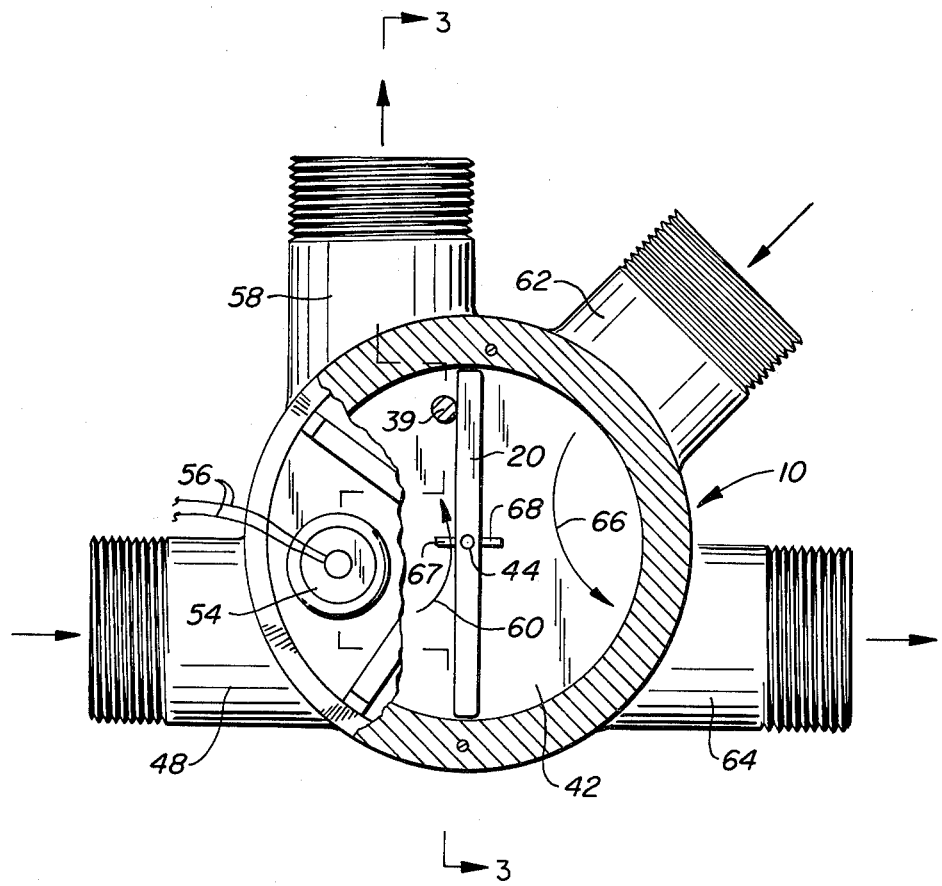
FIGS. 2A and 2B are partially cutaway views of the preferred embodiment of the valve of the present invention illustrating the damper in the diversion and bypass positions respectively.
Figure 3:
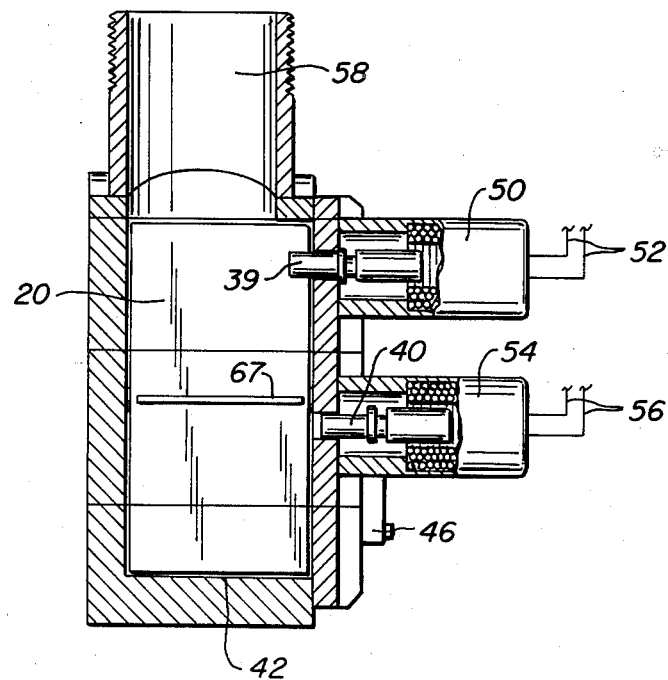
FIG. 3 is a section view taken along lines 3—3 of FIG. 2A.

Embodiment 10 of the valve of the present invention is illustrated in more detail by way of reference to FIGS. 2A and B and FIG. 3. Valve 10 includes a cylindrical chamber 42. A planar, generally rectangular damper 20 is mounted in chamber 42 on a rotatable shaft 44. A one-way clutch 46 is connected to shaft 44 so that damper 20 is only rotatable in a counterclockwise direction. One-way clutch 46 is most likely not necessary in most applications of the valve.

Fluid initially enters chamber 42 through primary inlet 48. Primary inlet 48 has an axis offset from that of chamber 42 so that the fluid entering the chamber through the primary inlet always tends to rotate damper 20 in a counterclockwise direction. As illustrated in FIGS. 2A and 3, stop 39 is extended to prevent damper 20 from rotating past in its diversion position. The force of the fluid entering the chamber through primary inlet 48, together with one-way clutch 46 if needed, maintains damper 20 in its diversion position.

As illustrated in FIG. 3, stop 39 is controlled by a solenoid 50 having leads 52 to controller 34 (FIG. 1). Stop 40 is actuated by a similar solenoid 54 connected to controller 34 by leads 56. In the diversion position of damper 20 illustrated in FIG. 3, stop 40 is in its retracted position to allow damper 20 to move from its bypass position to the diversion position illustrated.

A diversion outlet 58 emanates from housing 42 so that the diversion outlet is on the same side of damper 20 as primary inlet 48 when the damper is in its diversion position. In the preferred embodiment illustrated, the axis of diversion outlet 58 is perpendicular to that of primary inlet 40. The fluid entering chamber 42 from primary inlet 48 with damper 20 in its diversion position is deflected by the damper, as illustrated by arrow 60, and leaves the chamber through diversion outlet 58. The cross-sectional area of chamber 42 defined by damper 20 through which the fluid flows is no less than that of inlet 48 and outlet 58 to minimize pressure losses through the valve.

A diversion inlet 62 emanates from chamber 42. In the preferred embodiment diversion inlet 62 has an axis which intersects that of the chamber to avoid difficulty in making fittings to both the diversion inlet and diversion outlet 58. Diversion inlet 62 is located so that it is isolated from both primary inlet 48 and diversion outlet 58 when damper 20 is in its diversion position. The fluid which had exited chamber 42 through diversion outlet 58 returns to the chamber through diversion inlet 62 in most applications. In certain applications, however, the fluid entering chamber 42 through diversion inlet 62 may be different from that leaving through diversion outlet 58.

A primary outlet 64 emanates from housing 42, and in the embodiment illustrated, has an axis coincident with that of primary inlet 48. With damper 20 in its diversion position, the fluid entering chamber 42 through diversion inlet 62 is deflected by the damper as illustrated by arrow 66, and leaves the chamber through primary outlet 64. Again, the cross-sectional area of chamber 42 defined by damper 20 through which the fluid flows is no less than that of inlet 62 and outlet 64.

Figure 2B:
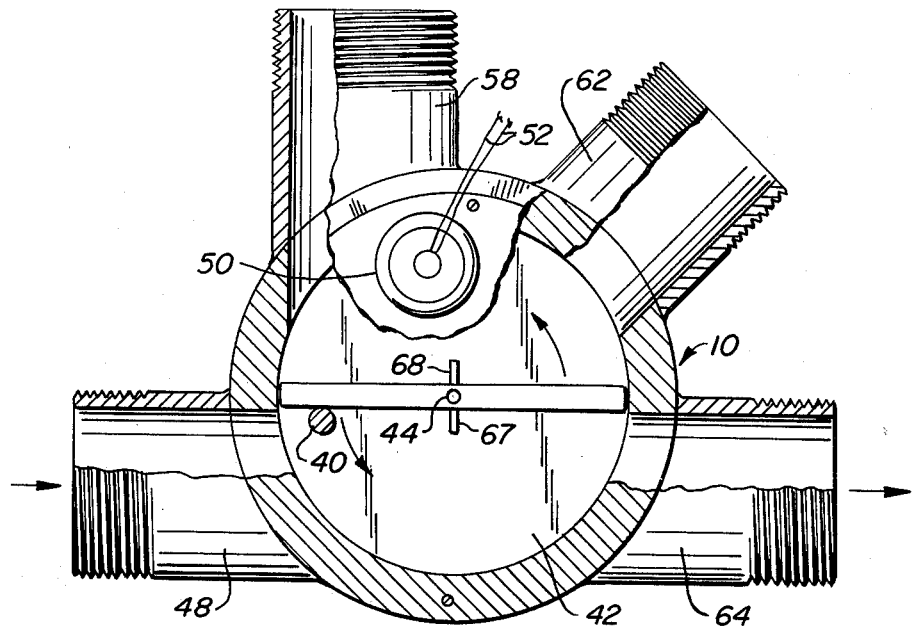

When stop 39 is retracted by solenoid 50, the pressure of the fluid entering chamber 42 through primary inlet 48 forces damper 20 to rotate in a counterclockwise direction. Stop 40 is extended by solenoid 54 to prevent further rotation of damper 20, and damper 20 is in its bypass position as illustrated in FIG. 2B. The pressure of the fluid flowing through chamber 42 is usually sufficient to maintain damper 20 in contact with stop 40. Unwanted clockwise rotation of damper 20 is also prevented by one-way clutch 46.

In the bypass configuration illustrated in FIG. 2B, diversion outlet 58 and diversion inlet 62 are isolated from primary inlet 48. As a result, the liquid entering chamber 42 through primary inlet 48 passes directly through the chamber and out through primary outlet 64. Virtually no pressure losses whatsoever are encountered because the cross-sectional area of the portion of chamber 42 defined by damper 20 through which the fluid moves is at least as great as inlet 48 and outlet 64 and flow through the valve is substantially unrestricted.

When valve 10 is to be recycled to its diversion configuration, stop 39 is extended and stop 40 is retracted. Small protrusions 67, 68 may be provided which extend transversely from damper 20 in a plane containing shaft 44. Projection 67 extends downwardly into the fluid stream and exerts a torque on damper 20 tending to rotate it in a counterclockwise direction. Once the edge of damper 20 is deflected into the entering fluid stream of primary inlet 48, the damper rotates quickly to its diversion configuration of FIG. 2A.

The function of projections 67, 68 is merely to get damper 20 started moving in the clockwise direction. It is contemplated that other techniques could be used for this purpose as well, such as the establishment of a slight negative pressure near primary inlet 48. The fluid pressure itself may be sufficient to initiate rotation of the damper and render the use of such techniques unnecessary.

While a preferred embodiment of the present invention has been illustrated in detail, it is apparent that modifications and adaptations of that embodiment will occur to those skilled in the art. For example, it is noted that the axis of the primary inlet is offset from that of the chamber so that the damper is forced to rotate, but the configuration of the remaining fluid connection may be varied. Also, multiple pairs of diversion inlet/outlets may be incorporated in a valve with a multi-blade damper. However, it is to be expressly understood that such modifications and adapatations are within the spirit and scope of the present invention, as set forth in the following claims.

What is claimed is:

1. A diverter/bypass valve comprising:
   a housing including a chamber which is rotationally symmetric about one axis;
   a damper mounted within the housing so that the damper is rotatable about the axis of the chamber;
   a pair of movable stops adapted to enable the damper to rotate in a preferred direction and to stop in either of two positions, one such position being a diversion position and the other such position being a bypass position;
   a primary inlet in the housing having an axis offset from the axis of the chamber so that the fluid entering the chamber through the primary inlet tends to rotate the damper in the preferred direction;
   a diversion outlet located in the housing so that the damper prevents fluid communication from the primary inlet to the diversion outlet through the chamber when the damper is in its bypass position, and allows such communication in its diversion position;
   a diversion inlet located in the housing so that the damper prevents fluid communication from the primary inlet to the diversion inlet through the chamber in both its diversion and bypass positions, and prevents fluid communication from the diversion outlet to the diversion inlet through the chamber in its diversion position; and
   a primary outlet located in the housing so that the damper allows fluid communication from the diversion inlet to the primary outlet through the chamber when the damper is in its diversion position, and allows fluid communication from the primary inlet to the primary outlet through the chamber when the damper is in its bypass position, so that a fluid entering the chamber with the damper in the diversion position exits the chamber through the diversion outlet, while fluid entering the chamber through the diversion inlet exits the chamber through the primary outlet, and a fluid entering the chamber with the damper in the bypass position leaves the chamber directly through the primary outlet.

2. A valve as recited in claim 1 wherein the chamber is generally cylindrical.

3. A valve as recited in claim 1 wherein the damper is generally planar and bisects the chamber.

4. A valve as recited in claim 1 wherein the axis of the primary outlet is aligned with that of the primary inlet.

5. A valve as recited in claim 4 wherein the axis of the diversion inlet intersects the axis of the chamber.

6. A valve as recited in claim 1 wherein the axis of the diversion outlet is perpendicular to that of the primary inlet.

7. A valve as recited in claim 1 wherein the stops are disposed radially outwardly from the axis of the chamber.

8. A valve as recited in claim 1 wherein the cross-sectional areas of the flow paths through the chamber are no less than those of the inlets and outlets such that pressure losses across the valve are minimized.

9. A valve as recited in claim 1 wherein only a single diversion inlet and diversion outlet emanate from the housing.

10. A diverter/bypass valve comprising: a housing including a cylindrical chamber;
    a generally planar rectangular damper mounted within the housing so that the damper is rotatable about the axis of the cylindrical chamber;
    a pair of movable stops disposed radially outwardly from the axis of the chamber and adapted to enable the damper to rotate in a preferred direction and to stop in either of two positions located 90° from one another, one such position being a diversion position and the other such position being a bypass position;
    a primary inlet in the housing having an axis offset from the axis of the chamber so that the fluid entering the chamber through the primary inlet tends to rotate the damper in the preferred direction;
    a diversion outlet located in the housing so that the damper prevents fluid communication from the primary inlet to the diversion outlet through the chamber when the damper is in its bypass position, and allows such fluid communication in its diversion position;
    a diversion inlet located in the housing so that the damper prevents fluid communication from the primary inlet to the diversion inlet through the chamber in both its diversion and bypass positions, and prevents fluid communication from the diversion outlet to the diversion inlet through the chamber in its diversion position; and
    a primary outlet in the housing having an axis coincident with the axis of the primary inlet, the primary outlet being located so that the damper allows fluid communication from the diversion inlet to the primary outlet through the chamber when the damper is at its diversion position, and allows fluid communication from the primary inlet to the primary outlet through the chamber when the damper is in its bypass position, so that a fluid entering the chamber with the damper in its diversion position exits the chamber through the diversion outlet, while fluid entering the chamber through the diversion inlet exits the chamber through the primary outlet, and a fluid entering the chamber with the damper in the bypass position leaves the chamber directly through the primary outlet.

11. A valve as recited in claim 1 or 10 wherein the movable stops include solenoid means controlling the position of the stops.

12. A valve as recited in claim 1 or 10 and additionally comprising a solar collector connected to the diversion outlet and inlet of the valve so that a fluid entering the valve passes through the solar collector when the damper is in its diversion position and bypasses the solar collector when the damper is in its bypass position.

13. A valve as recited in claim 12 and additionally comprising means for actuating the movable stops responsively to solar conditions.

14. A valve as recited in claim 1 or 10 and additionally comprising clutch means mounted to the damper to prevent rotation of the damper in other than its preferred direction.

* * * * *